Patented Feb. 16, 1932

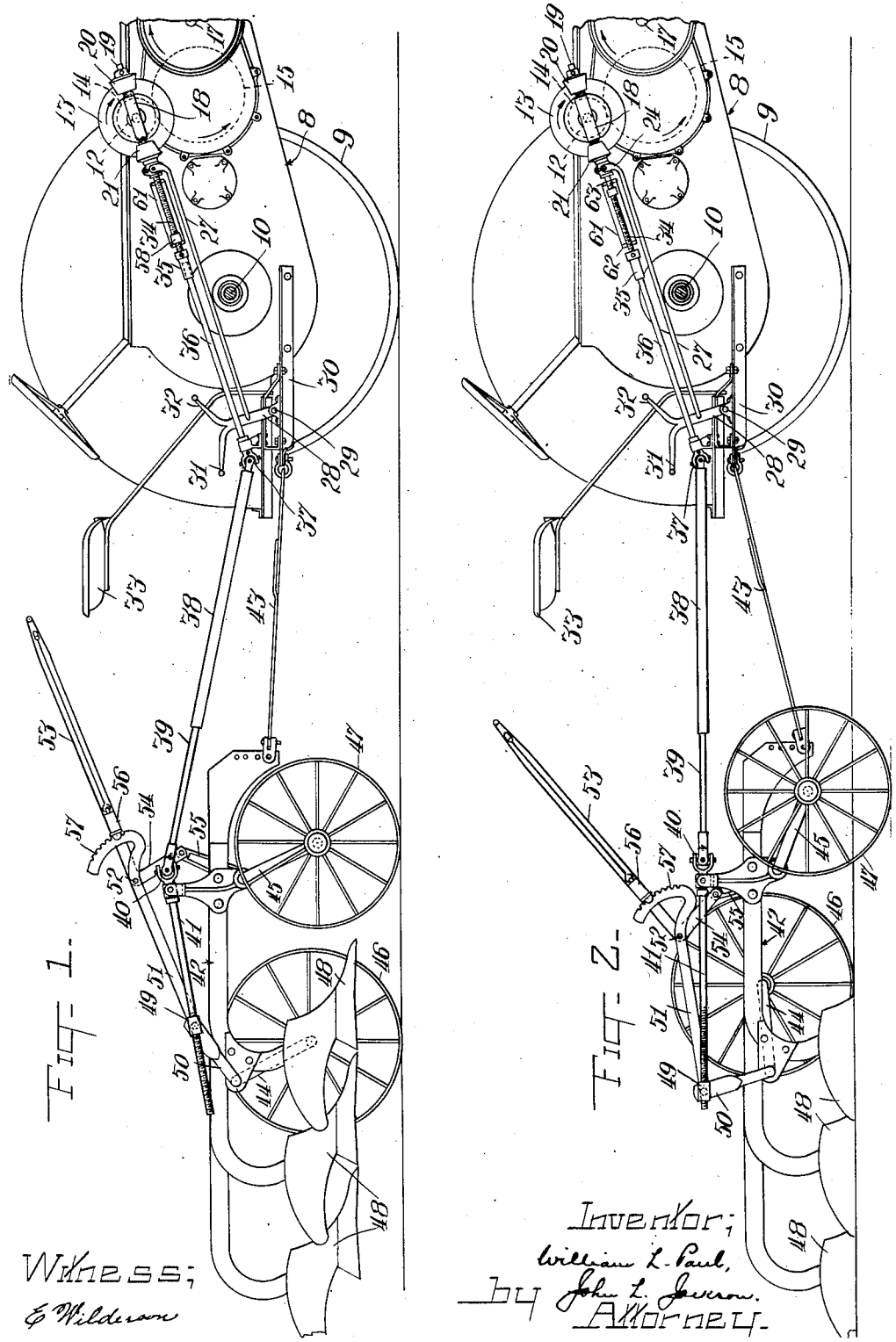

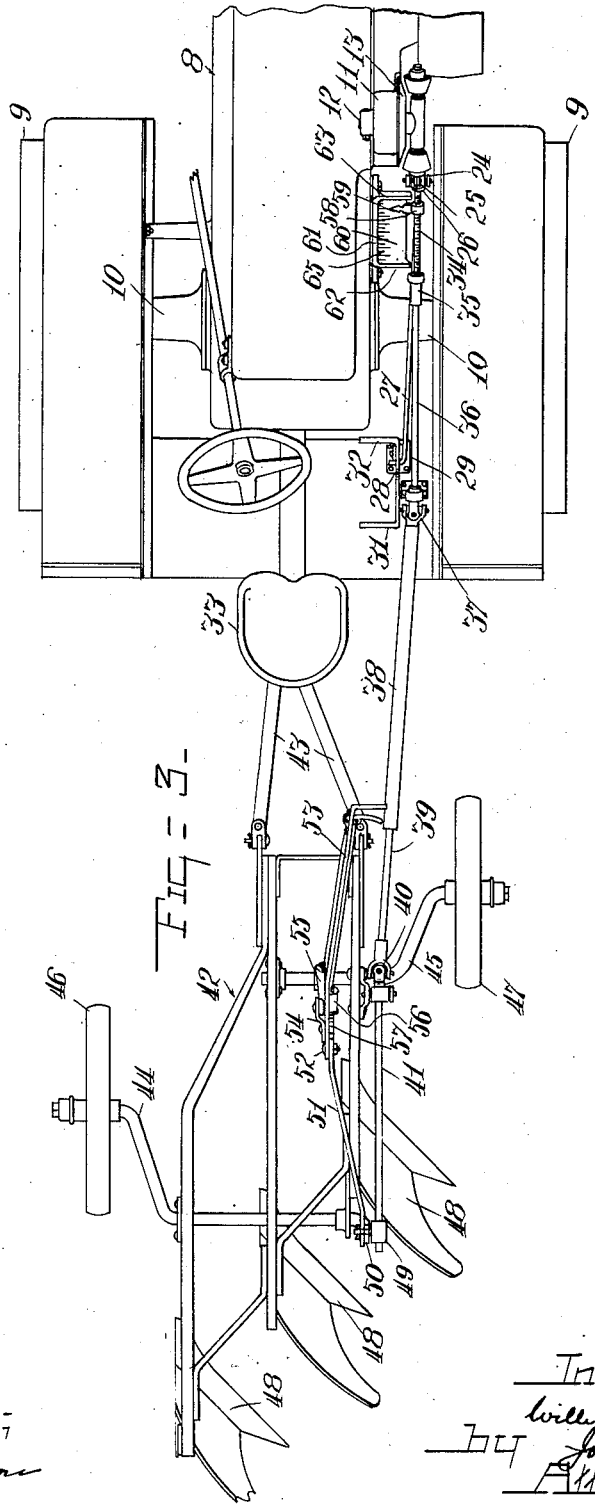

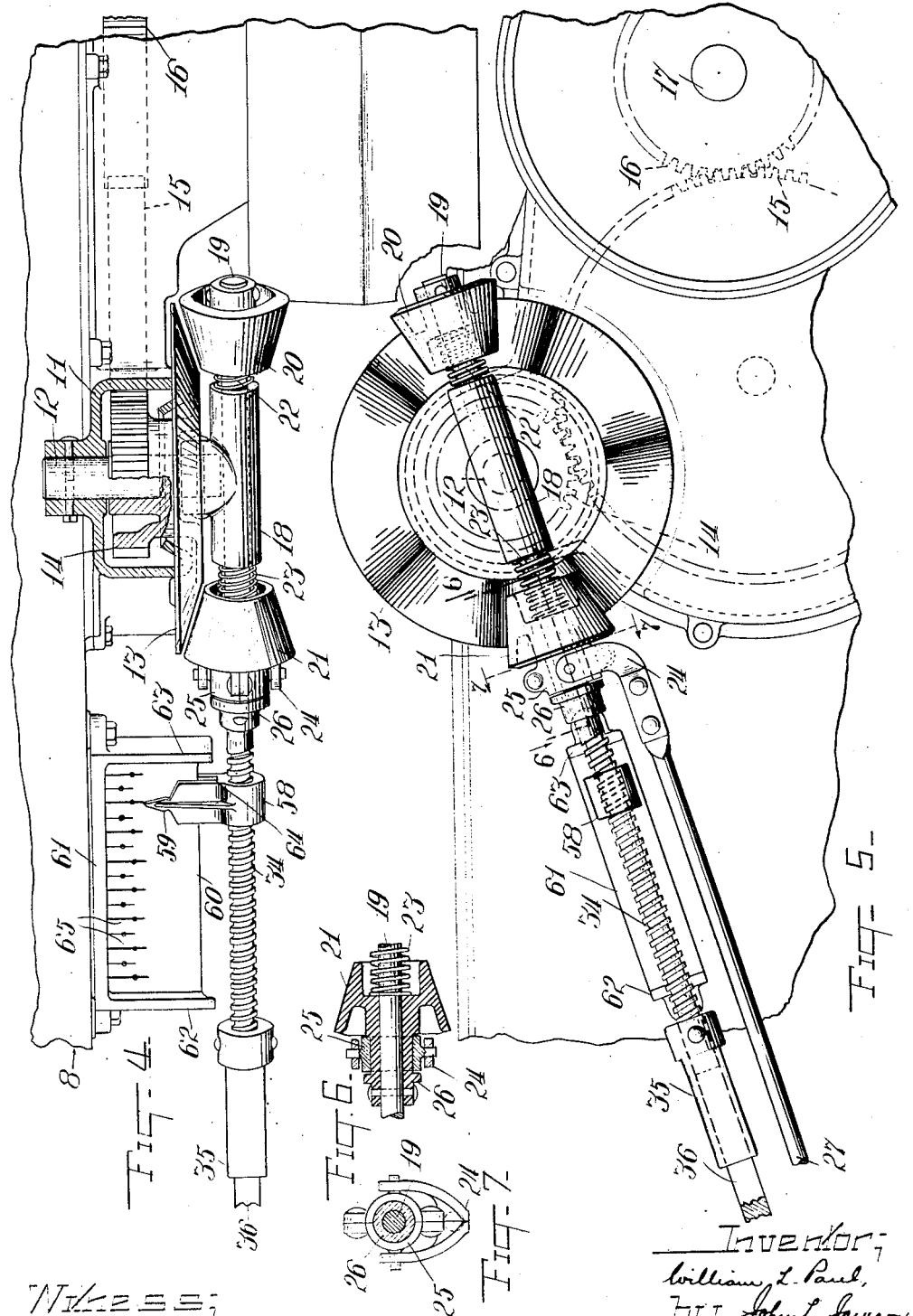

1,845,178

UNITED STATES PATENT OFFICE

WILLIAM L. PAUL, OF BERKELEY, CALIFORNIA, ASSIGNOR TO DEERE AND COMPANY, OF MOLINE, ILLINOIS, A CORPORATION OF ILLINOIS

POWER-ACTUATED LIFTING MECHANISM FOR IMPLEMENTS

Application filed November 13, 1925. Serial No. 68,836.

My invention has to do with utilizing power derived from the motor of a tractor for lifting or lowering the furrow openers of a plow, or doing equivalent work in connection with other types of agricultural implements, and it has particularly for its object to provide a construction by which the power operated mechanism may be actuated regardless of whether the tractor is in motion or not. In the use of tractors for farming operations, it frequently occurs that when the tractor strikes a soft spot traction is reduced to a point where the tractor is incapable of hauling its load, such as a gang plow, although it would still be able to propel itself if relieved of the load. In such cases, therefore, the tractor becomes stalled with the furrow openers deeply embedded in the soil, and a good deal of hard work is required to raise the furrow openers out of the ground so as to reduce the load to a point where the tractor can free itself from the mire. Sometimes it is necessary to uncouple the tractor from the plow so that it can advance to hard ground, and to free the plow separately. This of course seriously interferes with plowing operations. My present invention overcomes this trouble by providing means by which the power of the tractor motor may be employed to lift the furrow openers out of the ground while the tractor is standing still, thereby relieving it of the greater part, if not practically all, of its load, which in most cases will permit it to advanve beyond the soft spot.

In the use of tractor drawn gang plows the work of adjusting the plowing depth is usually onerous, and another object of my invention is to provide means by which the plowing depth may be adjusted by power derived from the tractor motor, and in connection therewith a further object is to provide means for indicating the plowing depth so that the operator will always know at what depth the furrow openers are set to operate. I accomplish these objects as illustrated in the drawings and as hereinafter described. What I regard as new is set forth in the claims.

In the accompanying drawings,—

Fig. 1 is a side elevation illustrating my invention applied to the operation of a gang plow, the furrow openers being in their raised or inoperative position;

Fig. 2 is a similar view showing the furrow openers in operative position;

Fig. 3 is a plan view;

Fig. 4 is an enlarged detail, partly in plan and partly in section, showing the devices mounted on the tractor for transmitting power to the plow or other implement;

Fig. 5 is a side elevation of the parts shown in Fig. 4;

Fig. 6 is a detail, being a section on line 6—6 of Fig. 5; and

Fig. 7 is a cross-section on line 7—7 of Fig. 5.

Referring to the drawings, 8 indicates the frame of the tractor, the rear part only of which is illustrated. It will be understood that the tractor may be of any approved design of the type propelled by means of a motor driven shaft adapted to be connected with or disconnected from the propelling wheels, as by suitable clutch mechanism. In the illustrated construction 9 indicates the rear propelling wheels of the tractor, and 10 the rear axle by which the traction wheels 9 are driven. Mounted on the tractor frame, preferably in a housing 11 at one side thereof, is a short shaft 12 on which is journaled a combined gear and bevel friction wheel, the beveled friction portion of which is indicated by 13 and the gear portion by 14, the friction portion being outermost and being arranged to rotate in a longitudinal vertical plane, as best shown in Fig. 4. The gear wheel 14 meshes with a gear 15, and the latter meshes with a spur pinion 16 mounted on a shaft 17 and connected with the motor so as to be constantly driven when the motor is in operation, regardless of whether the traction wheels 9 are being driven or not. This is best accomplished by driving the pinion 16 directly from the usual crank shaft of the motor.

The outer end of the shaft 12 carries a tubular bearing 18, the axis of which is parallel with the proximate face of the bevel friction wheel 13, as best shown in Fig. 4, through which bearing extends a round shaft 19 on which are mounted two oppositely disposed friction pinions 20, 21, said pinions being fixedly connected with the shaft 19 so that they rotate therewith. The pinions 20, 21 are so positioned that normally they are both out of contact with the beveled surface of the friction wheel 13, and they are normally held in such position by springs 22, 23 interposed between them and the adjacent ends of the bearing 18. The shaft 19 is movable longitudinally in the bearing 18, and it is obvious, therefore, that by moving said shaft in one direction or the other, one or the other of the pinions 20, 21 may be moved into operative engagement with the friction wheel 13 so as to rotate the shaft 19 in one direction or the other. The shaft 19 is moved endwise to carry one or the other of said pinions into engagement with said friction wheel by means of a yoke 24 the forked portion of which is pivotally connected with a split collar 25 loosely mounted on the shaft 19 between the pinion 21 and a collar 26 secured to the rear end portion of said shaft. As best shown in Fig. 6, this is best accomplished by providing the pinion with an extended hub reduced in diameter intermediately to form the collar 26, and fitting the split collar 25 on the reduced portion of said hub.

The yoke 24 is connected by a connecting rod 27 with a lever 28, preferably a foot lever, pivotally mounted at 29 on a platform 30 at the rear portion of the tractor frame. Said foot lever is provided with arms 31, 32 extending in opposite directions and arranged conveniently to an operator seated on a seat 33 shown in Fig. 1. By pressing on one or the other of the arms 31, 32, the shaft 19 may therefore be moved in one direction or the other to move one or the other of the pinions 20, 21 into engagement with the friction wheel 13.

The shaft 19 is provided with a rearward extension 34, which is screw-threaded, as best shown in Fig. 4, and at its rear end is provided with a sleeve 35 the bore of which is a square or otherwise made non-circular in cross-section. Into the bore of the sleeve 35 and telescopically but non-rotatably engaging the same is a shaft 36, the rear end of which is connected by a universal coupling 37 with a tubular shaft 38, best shown in Figs. 1 and 2. Telescopically and non-rotatably engaging the shaft 38 is a shaft 39 which at its rear end is connected by a universal joint 40 with a shaft 41 by which power is communicated to the implement drawn by the tractor. In the illustrated construction such implement is in the form of a gang plow 42 arranged to be drawn by the tractor by means of a draft connection 43 of any suitable design. In the illustrated arrangement the plow is mounted on crank axles 44, 45 carried by land and furrow wheels 46, 47, respectively, the arrangement being such that by swinging said crank axles the furrow openers 48 of the plow may be raised or lowered. Power is applied to swing the crank axles 44, 45 when the shaft 41 is rotated in either direction, through the instrumentality of a screw-threaded sleeve 49 through which the screw-threaded portion of the shaft 41 operates, said sleeve being swiveled upon the upper end of an arm 50 rising from the crank axle 44 and nonrotatably secured thereto. Said arm is connected by a link 51 with the fulcrum 52 of a manually operated lever 53 having a crank arm 54 which is connected to an arm 55 rising from and secured to the furrow wheel axle 45. The lever 53 is provided with the usual latch mechanism 56 arranged to cooperate with a notched sector 57 carried by the link 51, as best shown in Figs. 1 and 2. By this construction when the shaft 41 is rotated in either direction, the crank axles 44, 45 will be correspondingly rocked in the same direction, thereby raising or lowering the furrow openers, as the case may be.

It will be manifest from the foregoing description that by pressing on the arm 32 of the foot lever 28, for example, the operator may move the shaft 19 forward, or to the right, to carry friction pinion 21 into engagement with friction wheel 13, thereby causing the shaft 36 to rotate in one direction, which rotation will be transmitted to the crank axles of the plow so that they will be swung in one direction. The forward movement of the shaft 19 is independent of the shaft 36, as said shafts are telescopically connected, as has been explained. By pressing on the arm 31 the pinion 20 may in like manner be moved into engagement with the friction wheel 13, thereby rotating the shaft 19 in the opposite direction and consequently swinging the cranks 44, 45 also in the opposite direction. The purpose of providing the telescopic connection between the shafts 38, 39 is to permit the plow to have freedom in turning.

To prevent damage should the operator hold either pinion 20, 21 in engagement with the friction wheel 13 too long, as for instance after the plow axles have reached the limit of their movement, and at the same time to indicate the position of said axles and therefore the position of the furrow openers, a head 58 is mounted on the screw-threaded portion 34 of the shaft 19 so as to travel on such threads in one direction or the other as said shaft rotates. Said head is provided with a pointer 59 which moves along an indicator plate 60 graduated in any suitable way and secured to the frame of the tractor so that it extends longitudinally thereof parallel with the path traveled by the head 58. Preferably said plate is carried by a bracket 61, as shown in Fig. 4. Said bracket is provided at its ends with stops 62, 63 which project laterally from the tractor frame into position to intercept the head 58 when it reaches either end of its range of movement, thereby stopping further movement in the same direction. The head 58 is held against rotation by the plate 60 which projects into a slot 64 in said head, as best shown in Fig. 4, and therefore as the shaft 19 rotates the screw threads 34 thereof will cause the head to travel longitudinally of said shaft. If the rotation of the shaft 19 continues for a long enough time, the head will finally come into engagement with either one of the stops 62, 63, and its further movement in the same direction will be prevented. When this occurs, if the shaft 19 continues to rotate in the same direction, its screw threads 34 will cause it to travel through the head 58 in such direction as to move the operating pinion 20 or 21, as the case may be, out of engagement with the friction wheel 13, thereby stopping the rotation of said shaft. The movement of the head 58 is indicated by the pointer 59 in connection with the graduations or scale 65 on the plate 60, and as such scale is graduated in correlation with the different positions of the furrow openers, the pointer 59 always indicates their vertical position, so that the operator always knows at just what depth they are operating, or how high they are above the ground.

By the construction described, the furrow openers may be adjusted vertically as desired by power derived from the tractor motor whether the tractor be advancing or not, since, as has been explained, the friction wheel 13 is driven whenever the tractor motor is in operation. If the operator wishes to raise or lower the furrow openers while plowing, he can do so without stopping the tractor, so that aside from other considerations, if he fears the tractor will become mired, he can reduce the plowing depth so as to ease the load and avoid that danger. If the tractor becomes mired so that it cannot proceed, he can nevertheless use the power of the motor to raise the furrow openers out of the ground, thereby relieving the tractor of practically all of the load, which ordinarily will be sufficient to enable it to proceed.

By making the power transmitting devices that connect the power devices on the tractor with the parts on the implement to be adjusted longitudinally extensible, they do not interfere with turning movements, and the transmission of power is not affected by lateral swinging of the implement with respect to the tractor. Mounting the operating lever on the tractor frame makes it convenient for the operator to make the desired adjustments, while at the same time permitting him to operate the tractor.

While probably my invention will be found to be more generally useful in connection with tractor drawn plows to move the furrow opener or openers vertically, it may also be applied to adjust the tilling devices of other implements either vertically or in various other ways, as for example to angularly adjust the gangs of a disc harrow, and it should therefore be understood that the term "implement" as herein used is intended to be construed in a/generic sense to include any and all other agricultural appliances to which my improvements may be applicable. Furthermore, my invention is not limited to the specific construction shown and described, as various modifications may be made in the scope of the appended claims.

What I claim as my invention and desire to secure by Letters Patent, is—

1. The combination with a tractor comprising a motor operable to propel the same and also independently of such propulsion, and an implement drawn by the tractor comprising adjustable soil tilling devices, of a friction wheel driven by said motor independently of the propulsion of the tractor, power transmitting devices operable to adjust said soil tilling devices, comprising oppositely disposed friction pinions movable alternatively into or out of engagement with said friction wheel, a shaft on which said pinions are mounted, said shaft being movable endwise to carry one or the other of said pinions into engagement with said friction wheel, and means actuated by the rotation of said shaft for moving the same longitudinally to disconnect said pinions from said friction wheel when the shaft is rotated to a predetermined extent.

2. The combination with a tractor comprising a motor operable to propel the same and also independently of such propulsion, and an implement drawn by the tractor comprising adjustable soil tilling devices, of a friction wheel driven by said motor independently of the propulsion of the tractor, power transmitting devices operable to adjust said soil tilling devices, comprising oppositely disposed friction pinions movable alternatively into or out of engagement with said friction wheel, a shaft on which said pinions are mounted, a portion of said shaft being screw-threaded, a head mounted on the screw-threaded portion of said shaft, means for holding said head against rotation, and a stop cooperating with said head to effect longitudinal movement of said shaft when it has rotated to a predetermined extent.

3. The combination with a tractor comprising a motor operable to propel the same and also independently of such propulsion, and an implement drawn by the tractor comprising adjustable soil tilling devices, of a friction wheel driven by said motor independently of the propulsion of the tractor, power transmitting devices operable to adjust said soil tilling devices, comprising oppositely disposed friction pinions movable alternatively into or out of engagement with said friction wheel, a shaft on which said pinions are mounted, said shaft being movable endwise to carry one or the other of said pinions into engagement with said friction wheel, means actuated by the rotation of said shaft for moving the same longitudinally to disconnect said pinions from said friction wheel when the shaft is rotated to a predetermined extent, and a power transmitting shaft telescopically connected with said first-mentioned shaft.

4. The combination with a tractor comprising a motor operable to propel the same and also independently of such propulsion, of a friction wheel driven by said motor independently of the propulsion of the tractor, power transmitting devices comprising oppositely disposed friction pinions movable alternatively into or out of engagement with said friction wheel, a shaft on which said pinions are mounted, said shaft being movable endwise to carry one or the other of said pinions into engagement with said friction wheel, means actuated by the rotation of said shaft for moving the same longitudinally to disconnect said pinions from said friction wheel when the shaft is rotated to a predetermined extent, a power transmitting shaft telescopically connected with said first-mentioned shaft, an implement drawn by said tractor comprising adjustable soil tilling devices, and means operatively connected with said power transmitting shaft and actuated thereby to adjust said soil tilling devices.

5. The combination with a tractor comprising a motor operable to propel the same and also independently of such propulsion, of a friction wheel driven by said motor independently of the propulsion of the tractor, power transmitting devices comprising oppositely disposed friction pinions movable alternatively into or out of engagement with said friction wheel, a shaft on which said pinions are mounted, said shaft being movable endwise to carry one or the other of said pinions into engagement with said friction wheel, means actuated by the rotation of said shaft for moving the same longitudinally to disconnect said pinions from said friction wheel when the shaft is rotated to a predetermined extent, a power transmitting shaft telescopically connected with said first-mentioned shaft, an implement drawn by said tractor comprising vertically movable soil tilling devices, and means operatively connected with said power transmitting shaft and actuated thereby to move said soil tilling devices vertically.

6. In combination with a tractor and an implement propelled thereby and having soil engaging devices, of an endwise movable shaft extending from the tractor to the implement and operable by the rotation thereof to adjust said devices, means for deriving power from the tractor motor to rotate said shaft, and means operable upon the shaft when the latter has rotated a predetermined extent for moving said shaft endwise to disable said connecting means.

7. In an agricultural implement, the combination with a tractor comprising a motor operable to propel the same and also independently of such propulsion, and an implement drawn by said tractor comprising vertically movable soil tilling devices, of a member driven by said motor independently of the propulsion of the tractor, power transmitting devices including an adjustable shaft movable longitudinally of itself and having friction cones adapted to contact said member for rotating said adjustable shaft in either direction to move said soil tilling devices vertically, means operable to operatively connect or disconnect said friction cones and said member, and automatic means actuated by the rotation of said adjustable shaft to disconnect the friction cones from said member when said soil tilling devices are raised a predetermined extent.

8. The combination with a tractor comprising a motor operable to propel the same and a ground working tool, of a friction wheel driven by said motor independently of the propulsion of the tractor, power transmitting devices comprising oppositely disposed friction pinions movable alternatively into or out of engagement with said friction wheel, a shaft on which said pinions are mounted, said shaft being movable endwise to carry one or the other of said pinions into engagement with said friction wheel, and means actuated by the rotation of said shaft for moving the same longitudinally to disconnect said pinions from said friction wheel when the shaft is rotated a predetermined extent, said means including a plate mounted longitudinally of said movable shaft and having enlarged ends, a screw member threaded on said shaft and having fingers for embracing said plate, said fingers adapted to indicate the position of the ground working tools and to abut the enlarged ends of said plate to provide for maximum movement of said screw member on said plate.

WILLIAM L. PAUL.